US010956553B2

(12) United States Patent
Kong

(10) Patent No.: US 10,956,553 B2
(45) Date of Patent: Mar. 23, 2021

(54) METHOD OF UNLOCKING AN ELECTRONIC DEVICE, UNLOCKING DEVICE AND SYSTEM AND STORAGE MEDIUM

(71) Applicant: BEIJING KUANGSHI TECHNOLOGY CO., LTD., Beijing (CN)

(72) Inventor: Yuan Kong, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 187 days.

(21) Appl. No.: 16/147,102

(22) Filed: Sep. 28, 2018

(65) Prior Publication Data
US 2019/0340349 A1 Nov. 7, 2019

(30) Foreign Application Priority Data
May 4, 2018 (CN) .......................... 201810418988.1

(51) Int. Cl.
G06F 21/36 (2013.01)
G06F 21/32 (2013.01)
G06K 9/00 (2006.01)

(52) U.S. Cl.
CPC .............. *G06F 21/36* (2013.01); *G06F 21/32* (2013.01); *G06K 9/00255* (2013.01); *G06K 9/00288* (2013.01)

(58) Field of Classification Search
USPC ....................................................... 713/182
See application file for complete search history.

(56) References Cited

U.S. PATENT DOCUMENTS 8,079,079 B2 * 12/2011 Zhang ..................... G06F 21/32
706/48
8,627,939 B1 * 1/2014 Jones ....................... G07F 19/20
194/207

(Continued)

FOREIGN PATENT DOCUMENTS

| CN | 103400108 | 11/2013 |
| CN | 106534206 | 3/2017 |

OTHER PUBLICATIONS

Thavalengal et al., "Iris Authentication in Handheld Devices—Considerations for Constraint-Free Acquisition", IEEE Transactions on Consumer Electronics, vol. 61, No. 2, May 2015 (Year: 2015).*

(Continued)

*Primary Examiner* — Khalil Naghdali
(74) *Attorney, Agent, or Firm* — Hamre, Schumann, Mueller & Larson, P.C.

(57) ABSTRACT

A method of unlocking an electronic device, an unlocking device and system and a storage medium are provided. The method includes: acquiring at least one image to be authenticated, in which the image to be authenticated is an RGB image or an infrared image; obtaining an RGB image authentication result of the image to be authenticated by RGB object authentication of the image to be authenticated in a case where the image to be authenticated is the RGB image, and obtaining an infrared image authentication result of the image to be authenticated by infrared object authentication of the image to be authenticated in a case where the image to be authenticated is the infrared image; and determining whether to unlock the electronic device according to at least one of the RGB image authentication result and the infrared image authentication result.

14 Claims, 4 Drawing Sheets

(56) References Cited

U.S. PATENT DOCUMENTS

| | | | |
|---|---|---|---|
| 10,268,950 B2* | 4/2019 | Yin | G06K 9/628 |
| 2013/0015946 A1* | 1/2013 | Lau | G06F 21/32 |
| | | | 340/5.2 |
| 2015/0317464 A1* | 11/2015 | Willis | H04N 5/33 |
| | | | 348/78 |
| 2015/0356351 A1* | 12/2015 | Saylor | G01S 17/894 |
| | | | 348/164 |
| 2016/0366348 A1* | 12/2016 | Dixon | G06K 9/3233 |
| 2018/0276468 A1* | 9/2018 | Lee | G06K 9/00919 |
| 2019/0156003 A1* | 5/2019 | Alameh | G06F 21/45 |
| 2020/0151425 A1* | 5/2020 | Zhou | G06K 9/00255 |

OTHER PUBLICATIONS

Yassen et al., "Integer Wavelet Transform for Thermal Image Authentication", 2015 Seventh International Conference of Soft Computing and Pattern Recognition, 2015 IEEE (Year: 2015).*

First Chinese Office Action, issued in the corresponding Chinese patent application No. 201810418988.1, dated Jun. 3, 2020, 22 pages.

* cited by examiner

METHOD OF UNLOCKING AN ELECTRONIC DEVICE, UNLOCKING DEVICE AND SYSTEM AND STORAGE MEDIUM

CROSS-REFERENCE TO RELATED APPLICATIONS

The application claims priority to the Chinese patent application No. 201810418988.1, filed on May 4, 2018, the entire disclosure of which is incorporated herein by reference as part of the present application.

TECHNICAL FIELD

Embodiments of the present disclosure relate to a method of unlocking an electronic device, an unlocking device and system, and a storage medium.

BACKGROUND

With development of technology, unlocking methods of mobile terminals are increasingly diversified. For example, unlocking may be implemented by recognition of the user's face, so the unlocking process is convenient and fast and helps to improve the user experience.

SUMMARY

At least one embodiment of the present disclosure provides a method of unlocking an electronic device, comprising: acquiring at least one image to be authenticated, in which the image to be authenticated is an RGB image or an infrared image; obtaining an RGB image authentication result of the image to be authenticated by RGB object authentication of the image to be authenticated in a case where the image to be authenticated is the RGB image, and obtaining an infrared image authentication result of the image to be authenticated by infrared object authentication of the image to be authenticated in a case where the image to be authenticated is the infrared image; and determining whether to unlock the electronic device according to at least one of the RGB image authentication result and the infrared image authentication result.

For example, in the method provided by an embodiment of the present disclosure, the infrared image comprises an infrared image, and the infrared object authentication comprises infrared object authentication.

For example, in the method provided by an embodiment of the present disclosure, obtaining the RGB image authentication result of the image to be authenticated by the RGB object authentication of the image to be authenticated comprises: obtaining an object comparison result of the image to be authenticated by an object comparison of the image to be authenticated and a first background database image; and determining the RGB image authentication result of the image to be authenticated at least based on the object comparison result of the image to be authenticated; and/or obtaining the infrared image authentication result of the image to be authenticated by the infrared object authentication of the image to be authenticated comprises: obtaining an object comparison result of the image to be authenticated by an object comparison of the image to be authenticated and a second background database image; and determining the infrared image authentication result of the image to be authenticated at least based on the object comparison result of the image to be authenticated.

For example, in the method provided by an embodiment of the present disclosure, obtaining the RGB image authentication result of the image to be authenticated by the RGB object authentication of the image to be authenticated further comprises: obtaining an RGB liveness detection result of the image to be authenticated by an RGB liveness detection of the image to be authenticated; and determining the RGB image authentication result of the image to be authenticated at least based on the object comparison result of the image to be authenticated, in the case where the image to be authenticated is the RGB image, comprises: determining the RGB image authentication result of the image to be authenticated according to the object comparison result and the RGB liveness detection result of the image to be authenticated.

For example, in the method provided by an embodiment of the present disclosure, obtaining the infrared image authentication result of the image to be authenticated by the infrared object authentication of the image to be authenticated further comprises: obtaining an infrared liveness detection result of the image to be authenticated by an infrared liveness detection of the image to be authenticated; and determining the infrared image authentication result of the image to be authenticated at least based on the object comparison result of the image to be authenticated, in the case where the image to be authenticated is the infrared image, comprises: determining the infrared image authentication result of the image to be authenticated according to the object comparison result and the infrared liveness detection result of the image to be authenticated.

For example, in the method provided by an embodiment of the present disclosure, the first background database image comprises an RGB image and/or an infrared image of a first known object, and the second background database image comprises an RGB image and/or an infrared image of a second known object.

For example, in the method provided by an embodiment of the present disclosure, the at least one image to be authenticated comprises two images to be authenticated which are respectively a first RGB image and a first infrared image, and determining whether to unlock the electronic device according to the at least one of the RGB image authentication result and the infrared image authentication result comprises: determining to unlock the electronic device in a case where both the RGB image authentication result and the infrared image authentication result of the two images to be authenticated indicate that the object authentication passes and objects in the two images to be authenticated match with a same known object, or else, determining not to unlock the electronic device.

For example, in the method provided by an embodiment of the present disclosure, acquiring the at least one image to be authenticated comprises: acquiring at least one original image; and determining whether the original image satisfies preset conditions as for each of the at least one original image, determining that the original image is one of the at least one image to be authenticated in case so, or obtaining one of the at least one image to be authenticated by transformation of the original image, in which the preset conditions comprise one or more of following items: the original image is an image of a preset type, in which the image of the preset type is the RGB image and/or the infrared image, and the preset type is default or determined by a user instruction; image brightness of the original image is within a first brightness range; area brightness of a predetermined number of image areas in a first number of image areas of the original image is within a second brightness range; and a qualified object is detected in the original image.

For example, in the method provided by an embodiment of the present disclosure, that the qualified object is detected in the original image comprises: one or more of object size, object definition, object angle, object's extent of eye closure, and object's occlusion extent of the object detected in the original image satisfy corresponding requirements.

For example, the method provided by an embodiment of the present disclosure further comprises: obtaining the first number of image areas of the original image by adoption of a preset sliding window to slide on the original image, as for each of the at least one original image.

For example, in the method provided by an embodiment of the present disclosure, after determining whether the original image satisfies the preset conditions as for each of the at least one original image, the method further comprises: outputting unlocking failure information in a case where the original image does not satisfy the preset conditions.

For example, in the method provided by an embodiment of the present disclosure, after acquiring the at least one image to be authenticated, the method further comprises: determining whether the image to be authenticated is the RGB image or the infrared image according to data source information of the image to be authenticated, as for each of the at least one image to be authenticated, in which the data source information is used for indicating that corresponding image to be authenticated is from an RGB imaging mode or an infrared imaging mode.

At least one embodiment of the present disclosure further provides an unlocking device, comprising: an acquisition module configured to acquire at least one image to be authenticated, in which the image to be authenticated is an RGB image or an infrared image; an authentication module configured to obtain an RGB image authentication result of the image to be authenticated by RGB object authentication of the image to be authenticated in a case where the image to be authenticated is the RGB image, and obtain an infrared image authentication result of the image to be authenticated by infrared object authentication of the image to be authenticated in a case where the image to be authenticated is the infrared image; and an unlock determination module configured to determine whether to unlock an electronic device according to at least one of the RGB image authentication result and the infrared image authentication result.

At least one embodiment of the present disclosure further provides an unlocking system, comprising a processor and a memory, wherein computer program instructions are stored in the memory, and the method described above is executed when the computer program instructions are run by the processor.

At least one embodiment of the present disclosure further provides a storage medium, wherein program instructions are stored on the storage medium, and the method described above is executed when the program instructions are run.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure. It should be noted that the same reference symbols in the drawings are used to represent the same elements or steps.

DETAILED DESCRIPTION

Figure 1:
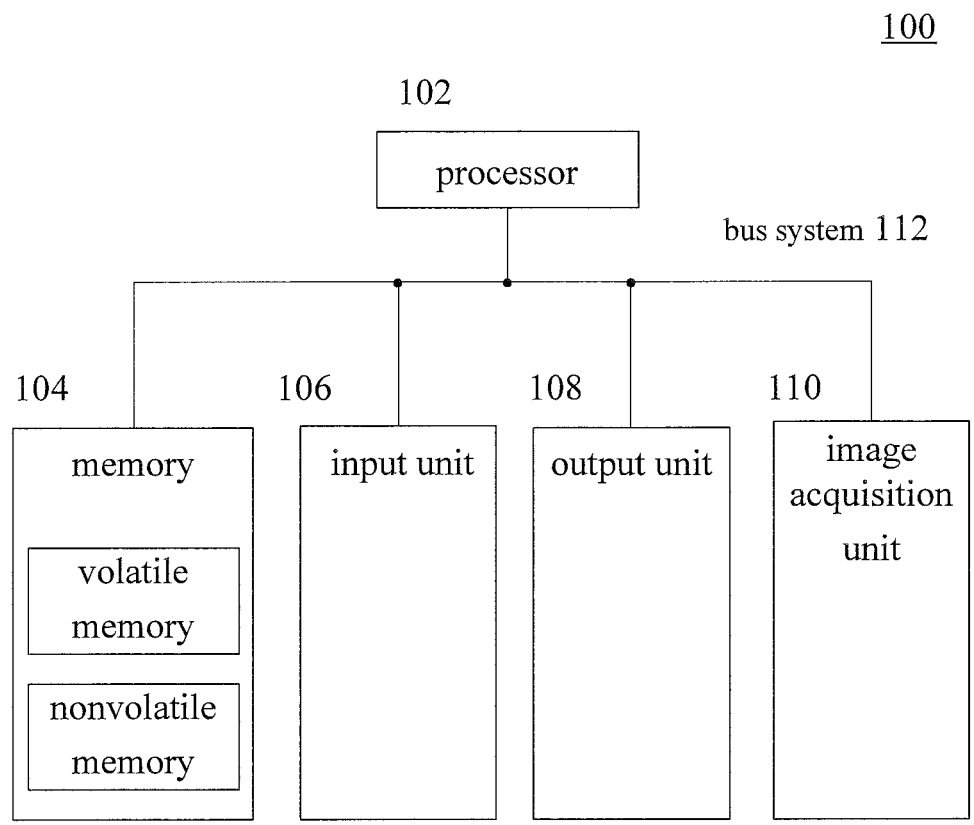
FIG. 1 is a schematic block diagram of an illustrative electronic device for implementing a method of unlocking an electronic device and an unlocking device provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly In mainstream proposals for face unlocking of mobile terminals, a front camera of the mobile terminal is usually used to capture a red, green and blue (RGB) image, and the RGB image is used as an input of a face unlocking system. When this method is used, in an environment with a dim light, an RGB image with sufficient brightness cannot be obtained, that is, unlocking effect consistent with that in normal light cannot be achieved.

Embodiments of the present disclosure provide a method of unlocking an electronic device, an unlocking device and system, and a storage medium. The method provided by the embodiments of the present disclosure can simultaneously support unlocking through RGB and infrared (e.g., infrared) images, that is, can utilize RGB images and infrared images acquired by a device to be unlocked to unlock the device. As for a device (e.g., a mobile terminal) employing the method provided by the embodiments of the present disclosure, in normal light scene, unlocking by an RGB image may be selected; and in dark scene, unlocking by an infrared image may be selected. By adoption of infrared images, even in dark environment, objects (e.g., face) can also be well recognized. The method not only can utilize the already accumulated advantages of the existing RGB unlocking but also can utilize infrared images to make up for the insufficiency of RGB images that can't be used for unlocking in dark scenes, and can greatly improve the speed and the accuracy in unlocking with a combination of both. The method of unlocking an electronic device and the unlocking device, provided by the embodiments of the present disclosure, may be applied in any field requiring unlocking, including but not limited to face unlocking for mobile terminal screens.

Description is given below to the technical proposal, capable of simultaneously utilizing RGB images and infrared (e.g., infrared) images for unlocking, provided by the embodiments of the present disclosure.

Firstly, description is given to an illustrative electronic device 100 for implementing the method of unlocking an electronic device and the unlocking device, provided by the embodiment of the present disclosure, with reference to FIG. 1.

As shown in FIG. 1, the electronic device 100 comprises one or more processors 102 and one or more memories 104. For instance, the electronic device 100 may further comprise an input unit 106, an output unit 108 and an image acquisition unit 110. The components are connected with each other through a bus system 112 and/or connecting mechanisms in other forms (not shown in the figure). It should be noted that the components and the structures of the electronic device 100 as shown in FIG. 1 are only exemplary and not limitative. The electronic device may also comprise other components and structures as required.

The processor 102 may be implemented by at least one hardware form of a digital signal processor (DSP), a field programmable gate array (FPGA), a programmable logic array (PLA) or a microprocessor. The processor 102 may be one or a combination of more selected from a central processing unit (CPU), a graphics processing unit (GPU), an application-specific integrated circuit (ASIC), and processing units in other forms having data processing capability and/or instruction execution capability, and can control other components in the electronic device 100 to execute desired functions.

The memory 104 may include one or more computer program products. The computer program products may include a variety of forms of computer readable storage media, e.g., volatile memories and/or nonvolatile memories. The volatile memory, for instance, may include a random access memory (RAM) and/or a cache. The nonvolatile memory, for instance, may include a read-only memory (ROM), a hard disk, a flash memory, and the like. One or more computer program instructions may be stored on the computer readable storage medium. The processor 102 may run the program instructions, so as to realize the client function as described below in the embodiment of the present disclosure (implemented by the processor) and/or other desired functions. A variety of applications and a variety of data, e.g., a variety of data used and/or produced by the applications, may also be stored on the computer readable storage medium.

For instance, the memory 104 may also include a memory away from the processor 102, e.g., a network attached storage medium accessed via a communication network (not shown in the figure). The communication network may be Internet, one or more intranets, local area network (LAN), wireless local area network (WLAN), storage area network (SAN) or the like, or a combination of a plurality of communication networks. In this way, the access of the memory 104 may be controlled by a memory controller (not shown in the figure). For instance, the communication network may adopt wireless communication mode or wired communication mode. The wireless communication mode may adopt any wireless communication protocol, such as bluetooth, ZigBee, global system for mobile communications (GSM), wideband code division multiple access (W-CDMA), code division multiple access (CDMA), time-division multiple address (TDMA), wireless fidelity (Wi-Fi), and the like, which is not limited in the embodiment of the present disclosure.

The input unit 106 may be a device that is used by a user to input instructions, and may include one or more selected from a keyboard, a mouse, a microphone, a touch panel and the like.

The output unit 108 may output a variety of information (e.g., image or sound) to the outside (for instance, the user), and may include one or more of a display, a loudspeaker, and the like. For instance, the input unit 106 and the output unit 108 can be integrated and implemented by a same interactive device (e.g., a touch panel).

The image acquisition unit 110 may acquire images, and store the acquired images in the memory 104 for the use of other components. The image acquisition unit 110 may be an independent camera or a camera in a mobile terminal. It should be understood that the image acquisition unit 110 is only illustrative, and the electronic device 100 may not comprise the image acquisition unit 110. In this case, other devices having image acquisition capability may be utilized to acquire images and send the acquired images to the electronic device 100.

Illustratively, the electronic device 100 may be any device such as a mobile phone, a tablet computer, a notebook computer, an e-book, a game machine, a television, a digital photo frame, a navigator or the like, and may also be a combination of any electronic device and hardware, which is not limited in the embodiment of the present disclosure. The electronic device 100 may include more or fewer components than shown in FIG. 1, or have different component configurations. The components may be implemented by hardware, software or a combination of hardware and software, and may include one or more DSPs and/or ASICs. The electronic device 100 can utilize the method provided by the embodiment of the present disclosure for unlocking, and can improve the speed and the accuracy of unlocking.

Illustratively, the illustrative electronic device for implementing the method and the unlocking device provided by the embodiment of the present disclosure may be implemented on a device such as a personal computer or a remote server.

Figure 2:
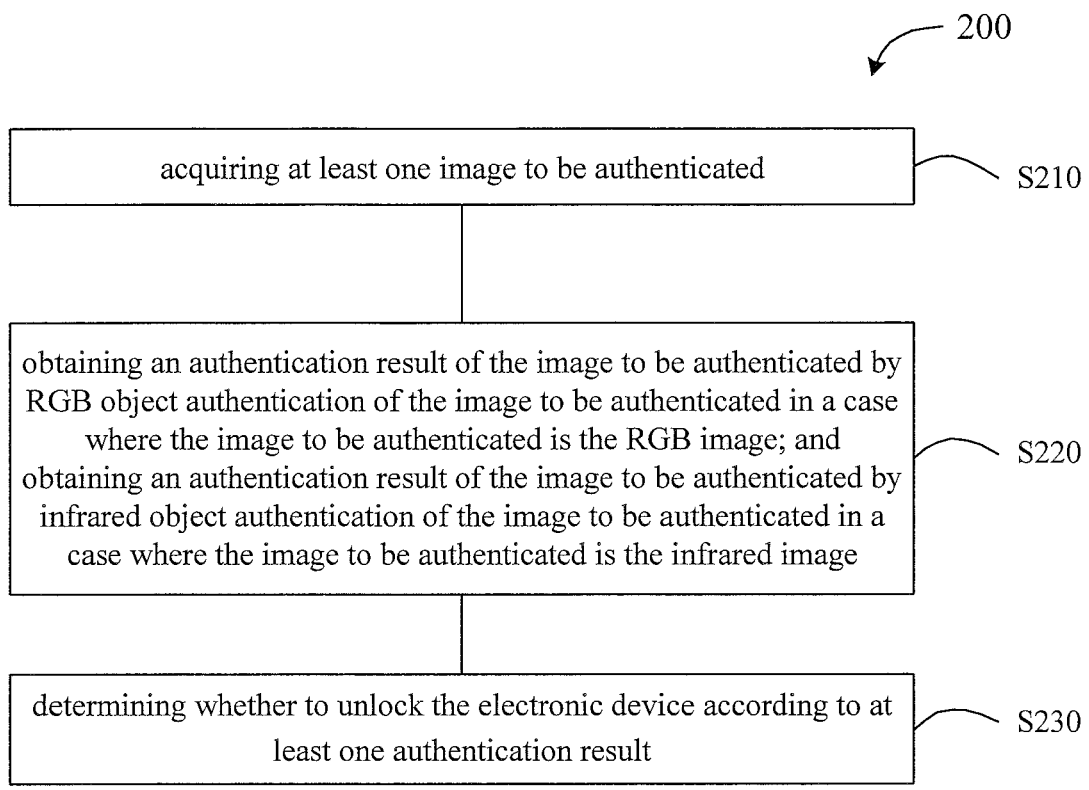
FIG. 2 is a schematic flowchart of a method of unlocking an electronic device provided by an embodiment of the present disclosure.

Description is given below to the method provided by the embodiment of the present disclosure with reference to FIG. 2. For instance, the method is applied to an electronic device. FIG. 2 is a schematic flowchart of a method 200 of unlocking an electronic device provided by an embodiment of the present disclosure. As shown in FIG. 2, the method 200 comprises the following steps of S210, S220 and S230.

Step S210: acquiring at least one image to be authenticated, in which the image to be authenticated is an RGB image or an infrared image.

The image to be authenticated may be an image including an object (e.g., face) and being used for unlocking a device. The device here may be any device such as a mobile terminal. The image to be authenticated may be a static image or a video frame in a video. The image to be authenticated may be an original image acquired by an image acquisition unit, and may also be an image obtained after the preprocessing (such as digitization, normalization, smoothing, etc.) of the original image.

The object may be any object for unlocking authentication, e.g., face or other parts of human body. Description is given below to the embodiment of the present disclosure by mainly taking the case that the object is face as an example.

Illustratively, the image to be authenticated may be selected from the original images acquired by the image acquisition unit on the basis of preset conditions. For instance, before face authentication, image quality and/or image type (whether an RGB image or an infrared image) of original images acquired by the image acquisition unit may be determined at first; original images satisfying the preset conditions may be taken as images to be authenticated for subsequent face authentication and other steps; and original images not satisfying the preset conditions may not need the subsequent steps.

Step S220: obtaining an RGB image authentication result of the image to be authenticated by RGB object authentication of the image to be authenticated, in a case where the image to be authenticated is the RGB image; and obtaining an infrared image authentication result of the image to be authenticated by infrared object authentication of the image to be authenticated, in a case where the image to be authenticated is the infrared image.

As for each of the at least one image to be authenticated, in the case where the image to be authenticated is the RGB image, the image to be authenticated is subjected to the RGB object authentication to obtain the RGB image authentication result of the image to be authenticated; and in the case where the image to be authenticated is the infrared image, the image to be authenticated is subjected to the infrared object authentication to obtain the infrared image authentication result of the image to be authenticated.

For instance, the infrared image may be any one of a near infrared image, a middle infrared image and a far infrared image, and correspondingly, the infrared object authentication may be one of near infrared object authentication, middle infrared object authentication and far infrared object authentication, which is not limited in the embodiment of the present disclosure. Description is given below by taking the case that the infrared image is a near infrared image and the infrared object authentication is near infrared object authentication as an example, but this does not constitute a limitation on the embodiment of the present disclosure.

The RGB image described in this disclosure refers to an image acquired by an image acquisition unit in RGB imaging mode or an image obtained by the transformation (such as scaling and/or cropping) of the image acquired in the RGB imaging mode, and the infrared image refers to an image acquired by an image acquisition unit in infrared imaging mode or an image obtained by the transformation of the image acquired in the infrared imaging mode. In an example, the image acquisition unit can switch between the RGB imaging mode and the infrared imaging mode as needed to respectively acquire an RGB image and an infrared image. In another example, the image acquisition unit can simultaneously adopt the RGB imaging mode and the infrared imaging mode to acquire images. In this case, as for a same face, one RGB image and one infrared image may be simultaneously acquired. Optionally, which imaging mode is adopted by the image acquisition unit at what time may be determined by user instruction or set by the unlocking system by default.

The images acquired by the image acquisition unit may include one or two of the RGB image and the infrared image. Correspondingly, at least one image to be authenticated may also include one or two of the RGB image and the infrared image.

In the case where the image to be authenticated is the RGB image, face authentication operation for RGB images (namely RGB face authentication) may be executed to obtain the RGB image authentication result of the image to be authenticated. In the case where the image to be authenticated is the infrared image, face authentication operation for infrared images (namely infrared face authentication) may be executed to obtain the infrared image authentication result of the image to be authenticated.

The face authentication operation may include face comparison and may also illustratively include a liveness detection, and the like. The face comparison is to compare a face to be authenticated in the image to be authenticated with a known face stored in a database (namely a background database), and determine whether the two faces are matched, that is, whether they belong to a same person. In an example, a face comparison result may be a result of one of values 0 and 1. For instance, the value 1 may be used to represent that the face to be authenticated in the image to be authenticated and the known face belong to a same face, and the value 0 represents that the face to be authenticated in the image to be authenticated and the known face belong to different faces. In another example, the face comparison result may be a similarity between the face to be authenticated in the image to be authenticated and the known face, and may be any value within the range [0, 1].

Illustratively, the RGB image authentication result or the infrared image authentication result may include a first result indicating that the face to be authenticated in the image to be authenticated passes authentication and a second result indicating that the face to be authenticated in the image to be authenticated does not pass authentication. When the RGB image authentication result or the infrared image authentication result is the first result, it can be determined to unlock. When the RGB image authentication result or the infrared image authentication result is the second result, it can be determined not to unlock.

In an example, the object authentication for RGB image and the object authentication for infrared image may be implemented by independent algorithms, respectively. In another example, the object authentication for RGB image and the object authentication for infrared image may be implemented by a unified algorithm.

Step S230: determining whether to unlock the electronic device according to at least one of the RGB image authentication result and the infrared image authentication result.

As described above, the image acquisition unit may acquire one RGB image or infrared image each time. In this case, the number of the at least one image to be authenticated may be one, that is, the unlocking process of the steps S210 to S230 may be respectively executed for each image to be authenticated.

In addition, as described above, the image acquisition unit may also simultaneously acquire one RGB image and one infrared image. In this case, at least two implementations may be selected. In an implementation, the number of the at least one image to be authenticated may be one, and the unlocking process of the steps S210 to S230 may be respectively executed for each image to be authenticated. In another implementation, the number of the at least one image to be authenticated may be two, including two images to be authenticated which are respectively a first RGB image and a first infrared image (i.e., an RGB image and an infrared image), and in the step S230, whether to unlock the electronic device is determined in accordance with the authentication results (i.e., the RGB image authentication result and the infrared image authentication result) of the two images to be authenticated.

The method provided by the embodiments of the present disclosure can utilize the RGB image and the infrared image acquired by the device to be unlocked to unlock the device. As for the device (e.g., a mobile terminal) employing the method provided by the embodiments of the present disclosure, in normal light scene, unlocking by an RGB image may be selected; and in dark scene, unlocking by an infrared image may be selected. By adoption of the infrared image, objects (e.g., face) can also be well recognized even in dark environment. Therefore, the infrared image unlocking can fully make up for the insufficiency of the RGB image unlocking, and in combination of both, the speed and the accuracy of unlocking can be greatly improved.

Illustratively, the method provided by the embodiments of the present disclosure may be implemented in a device, an apparatus or a system provided with a memory and a processor.

The method provided by the embodiments of the present disclosure may be deployed at an image acquisition terminal, for instance, in the application field of security protection, may be deployed at an image acquisition terminal of a gate control system; and in the financial application field, may be deployed at a personal terminal such as a smart phone, a tablet computer, a personal computer or the like.

For instance, the method provided by the embodiments of the present disclosure may also be deployed on the server side (or cloud side) and the personal terminal in a distributed manner. For instance, an image to be authenticated may be acquired on the client; the client sends the acquired image to the server side (or cloud side); and the server side (or cloud side) determines whether to unlock and feeds back the result of whether to unlock to the client, so that the client can perform unlocking operation according to the above result.

In the embodiment of the present disclosure, the step of obtaining the RGB image authentication result of the image to be authenticated by the RGB object authentication of the image to be authenticated, in the case where the image to be authenticated is the RGB image, includes: obtaining an object comparison result of the image to be authenticated by the object comparison of the image to be authenticated and a first background database image; determining the RGB image authentication result of the image to be authenticated at least based on the object comparison result of the image to be authenticated; and/or the step of obtaining the infrared image authentication result of the image to be authenticated by the infrared object authentication of the image to be authenticated, in the case where the image to be authenticated is the infrared image, includes: obtaining an object comparison result of the image to be authenticated by the object comparison of the image to be authenticated and a second background database image; and determining the infrared image authentication result of the image to be authenticated at least based on the object comparison result of the image to be authenticated.

In the embodiment of the present disclosure, the step of obtaining the RGB image authentication result of the image to be authenticated by the RGB object authentication of the image to be authenticated, in the case where the image to be authenticated is the RGB image, as for each of the at least one image to be authenticated, includes: obtaining an object comparison result of the image to be authenticated by the object comparison of the image to be authenticated and the first background database image, in the case where the image to be authenticated is the RGB image, as for each of the at least one image to be authenticated; and determining the RGB image authentication result of the image to be authenticated at least based on the object comparison result of the image to be authenticated.

Illustratively, the first background database image may include an RGB image and/or an infrared image of a first known object. For instance, the first background database image includes an RGB image of the first known object. The RGB image of the first known object may be acquired in normal light scene. Such RGB images can clearly and accurately reflect the characteristics of the object, thus ensuring the quality of the background database and being beneficial to achieve better object comparison effect. For instance, the first known object is a first known face. The first known face may be a face that is registered on the device to be unlocked, e.g., the face of the user of a mobile terminal.

It should be noted that the terms "first" and "second" adopted in this text are only used for distinguishing and do not indicate the sequence or other special meanings.

The background database may store a plurality of first background database images, and each image to be authenticated is compared with the first background database images in the background database one by one. As for each image to be authenticated, if there is a first background database image, matched with the image to be authenticated, in the background database, that is, there is a known face matched with the face to be authenticated in the image to be authenticated, it can be determined that the face comparison of the image to be authenticated passes. Conversely, if there is no first background database image, matched with the image to be authenticated, in the background database, that is, there is no known face matched with the face to be authenticated in the image to be authenticated, it can be determined that the face comparison of the image to be authenticated fails. For instance, a similarity between the known face in the first background database image matched with the image to be authenticated and the face to be authenticated in the image to be authenticated exceeds a first similarity threshold.

In the embodiment of the present disclosure, the step of obtaining the infrared image authentication result of the image to be authenticated by the infrared object authentication of the image to be authenticated, in the case where the image to be authenticated is the infrared image, as for each of the at least one image to be authenticated, includes: obtaining an object comparison result of the image to be authenticated by the object comparison of the image to be authenticated and a second background database image, in the case where the image to be authenticated is the infrared image, as for each of the at least one image to be authenticated; and determining the infrared image authentication result of the image to be authenticated at least based on the object comparison result of the image to be authenticated.

Illustratively, the second background database image may include an RGB image and/or an infrared image of a second known object.

As similar to the RGB image, when the image to be authenticated is an infrared image, face comparison may also be executed. The background database may include a plurality of second background database images. The second background database image, for instance, includes an infrared image. Each image to be authenticated is compared with the second background database images in the background database one by one. As for each image to be authenticated, if there is a second background database image, matched with the image to be authenticated, in the background database, that is, there is a known face matched with the face to be authenticated in the image to be authenticated, it can be determined that the face comparison of the image to be authenticated passes. Conversely, if there is no second background database image, matched with the image to be authenticated, in the background database, that is, there is no known face matched with the face to be authenticated in the image to be authenticated, it can be determined that the face comparison of the image to be authenticated fails. For instance, a similarity between the known face in the second background database image matched with the image to be authenticated and the face to be authenticated in the image to be authenticated exceeds a second similarity threshold. The second similarity threshold and the first similarity threshold may be same or different, and may be set as required.

The first background database image and the second background database image may be different images and may also be the same image. That is to say, when the images to be authenticated are the RGB image and the infrared image, the images may be respectively compared with different background database images and may also be compared with the same background database image, which may be set as needed.

The implementation of the RGB object comparison based on the first background database image and the implementation of the infrared object comparison based on the second background database image may be implemented in the same embodiment and may also be implemented in different embodiments.

In the embodiment of the present disclosure, the step of obtaining the infrared image authentication result of the image to be authenticated by the infrared object authentication of the image to be authenticated, in the case where the image to be authenticated is the infrared image, further includes: obtaining an infrared liveness detection result of the image to be authenticated by an infrared liveness detection of the image to be authenticated; and the step of determining the infrared image authentication result of the image to be authenticated at least based on the object comparison result of the image to be authenticated, in the case where the image to be authenticated is the infrared image, includes: determining the infrared image authentication result of the image to be authenticated according to the object comparison result and the infrared liveness detection result of the image to be authenticated.

The step of obtaining the RGB image authentication result of the image to be authenticated by the RGB object authentication of the image to be authenticated, in the case where the image to be authenticated is the RGB image, as for each of the at least one image to be authenticated, further includes: obtaining an RGB liveness detection result of the image to be authenticated by an RGB liveness detection of the image to be authenticated, in the case where the image to be authenticated is the RGB image, as for each of the at least one image to be authenticated; and the step of determining the RGB image authentication result of the image to be authenticated at least based on the object comparison result of the image to be authenticated, in the case where the image to be authenticated is the RGB image, as for each of the at least one image to be authenticated, includes: determining the RGB image authentication result of the image to be authenticated according to the object comparison result and the RGB liveness detection result of the image to be authenticated.

Apart from the object comparison, the liveness detection may also be selected and combined for object authentication. The implementation of the liveness detection can prevent illegal attackers from attacking the unlocking system by masks, videos, photos and the like, and avoid the loss of benefit of legitimate users.

The RGB liveness detection is a liveness detection for RGB image, and may be implemented by any suitable liveness detection mode, for instance, liveness detection based on action commands and the like.

In an example, if both the object comparison and the RGB liveness detection of the image to be authenticated pass, that is, the object comparison result indicates that there is a known object matched with the object to be authenticated in the image to be authenticated, and the object to be authenticated in the image to be authenticated is a living body, it can be determined that the authentication of the image to be authenticated passes, or else, it can be determined that the authentication of the image to be authenticated fails. When the authentication of the image to be authenticated passes, it can be determined to unlock, and then corresponding unlocking operations may be executed. The unlocking operations include: lighting up the screen, granting the user the right to operate a specific application, and the like.

In the embodiment of the present disclosure, the step of obtaining the infrared image authentication result of the image to be authenticated by the infrared authentication of the image to be authenticated, in the case where the image to be authenticated is the infrared image, further includes: obtaining an infrared liveness detection result of the image to be authenticated by an infrared liveness detection of the image to be authenticated; and the step of determining the infrared image authentication result of the image to be authenticated at least based on the object comparison result of the image to be authenticated, in the case where the image to be authenticated is the infrared image, includes: determining the infrared image authentication result of the image to be authenticated according to the object comparison result and the infrared liveness detection result of the image to be authenticated.

The step of obtaining the infrared image authentication result of the image to be authenticated by the infrared object authentication of the image to be authenticated, in the case where the image to be authenticated is the infrared image, as for each of the at least one image to be authenticated, further includes: obtaining an infrared liveness detection result of the image to be authenticated by an infrared liveness detection of the image to be authenticated, in the case where the image to be authenticated is the infrared image, as for each of the at least one image to be authenticated; and the step of determining the infrared image authentication result of the image to be authenticated at least based on the object comparison result of the image to be authenticated, in the case where the image to be authenticated is the infrared image, as for each of the at least one image to be authenticated, includes: determining the infrared image authentication result of the image to be authenticated according to the object comparison result and the infrared liveness detection result of the image to be authenticated.

As similar to the RGB image, when the image to be authenticated is an infrared image, face comparison and liveness detection may be combined for face authentication.

The infrared liveness detection is a liveness detection for infrared images, and may be implanted by any suitable liveness detection mode, for instance, liveness detection based on the reflection characteristic of infrared light.

In an example, the RGB liveness detection and the infrared liveness detection may be realized by a unified algorithm module. For instance, a suitable neutral network model may be constructed. No matter the input image is an RGB image or an infrared image, the neutral network model can perform the liveness detection on the input image. The neutral network model can realize such function by pre-training.

In an example, if both the object comparison and the infrared liveness detection of the image to be authenticated pass, that is, the object comparison result indicates that there is a known object matched with the object to be authenticated in the image to be authenticated, and the object to be authenticated in the image to be authenticated is a living body, it can be determined that the authentication of the image to be authenticated passes, or else, it can be determined that the authentication of the image to be authenticated fails.

In the embodiment of the present disclosure, the at least one image to be authenticated includes two images to be authenticated which are respectively a first RGB image and a first infrared image (i.e., an RGB image and an infrared image); and the step S230 may include: if both the RGB image authentication result and the infrared image authentication result of the two images to be authenticated indicate that the object authentication passes, and the objects in the two images to be authenticated match with a same known object, it is determined to unlock, or else, it is determined not to unlock.

As described above, whether to unlock may be determined according to the authentication result (i.e., the RGB image authentication result or the infrared image authentication result) of a single image, and may also be determined in combination of the authentication results (i.e., the RGB image authentication result and the infrared image authentication result) of a plurality of images of different types. For instance, supposing the image acquisition unit can acquire two images to be authenticated, which are respectively a first RGB image and a first infrared image (i.e., an RGB image and an infrared image), for a same face, in such example, respective face authentication may be respectively performed on the RGB image and the infrared image, so as to respectively obtain the authentication results of the RGB image and the infrared image. In an example, if both the RGB image and the infrared image indicate that the face authentication passes, and faces in the two images match with a same known face, it can be determined to unlock. The safety of the face unlocking system can be improved by simultaneous combination of the authentication results of the RGB image and the infrared image.

In the embodiment of the present disclosure, the step S210 may include: acquiring at least one original image; determining whether the original image satisfies preset conditions as each of the at least one original image, determining that the original image is one of the at least one image to be authenticated in case so, or obtaining one of the at least one image to be authenticated by transformation of the original image, wherein the preset conditions include one or more of following items: the original image is an image of a preset type, in which the image of the preset type is the RGB image and/or the infrared image, and the preset type is default or determined by a user instruction; image brightness of the original image is within a first brightness range; area brightness of a predetermined number of image areas in a first number of image areas of the original image is within a second brightness range; and a qualified object is detected in the original image.

For instance, before the face authentication step, the original images acquired by the image acquisition unit may be filtered out through some preset conditions; only images satisfying the preset conditions can be used for the subsequent face authentication step; and as for images not satisfying the preset conditions, it can be determined not to unlock, and some feedback information, e.g., unlocking failure information, may be outputted.

The original images satisfying the preset conditions may be directly taken as the images to be authenticated and be used for the subsequent face authentication step; or the original images may be subjected to some transformation, and transformed images are taken as the images to be authenticated and be used for the subsequent face authentication step. Illustratively, the transformation of the original image may include operations such as scaling and/or cropping on the original image. For instance, scaling can normalize the original image to a predetermined size. For instance, cropping can be that an image block including an object is extracted from the original image and taken as the image to be authenticated.

The preset conditions may be randomly set as required. In an example, the preset conditions may include: the original image is an image of a preset type. For instance, the user may input a user instruction for selecting the RGB image and/or the infrared image as the image of the preset type into the unlocking system through an input unit such as a keyboard, a mouse and/or a touch panel. The unlocking system may select images of the type indicated by the user instruction from the original images acquired by the image acquisition unit, and discard the remaining original images. In addition, the image of the preset type may also be set in the unlocking system by default, and the unlocking system automatically selects images in line with the default settings from the original images and discards the remaining original images.

In an example, the preset conditions may include: the image brightness of the original image is within the first brightness range. Illustratively, the image brightness is the average brightness of the original image. The first brightness range may be any suitable brightness range, may be set as required, and is not limited in the embodiment of the present disclosure. For instance, the first brightness range may be a range greater than a first brightness threshold, and the first brightness threshold may be the minimum image brightness that can meet the requirement of correct face recognition.

In an example, the preset conditions may include: the area brightness of a predetermined number of image areas in the first number of image areas of the original image is within the second brightness range. The second brightness range may be any suitable brightness range, may be set as required, and is not limited in the embodiment of the present disclosure. For instance, the second brightness range may be a range greater than a second brightness threshold, and the second brightness threshold may be equal to the first brightness threshold and may also be unequal to the first brightness threshold. For instance, after a plurality of image areas are acquired from the original image, whether the area brightness of at least one image area exceeds the second brightness threshold may be determined. It should be understood that even the overall average brightness of the original image meets requirements (for instance, within the first brightness range), the face may be still unable to be detected. In order to correctly recognize the face, the face area also needs to have sufficient brightness. Whether the brightness of a predetermined number (for instance, one) of image areas in the original image is enough may be determined at first, so as to ensure that the face is likely to be recognized in the original image. It makes more sense to continue to determine whether to unlock in this case. Thus, the setting of the preset conditions can reduce unnecessary operations and improve the unlocking efficiency.

Illustratively, the method 200 may further comprise: obtaining the first number of image areas of the original image by adoption of a preset sliding window to slide on the original image, as for each of the at least one original image. The size and the width-to-length ratio (for example, the size and the width-to-length ratio may be referred to as specification) of the preset sliding window may be arbitrarily set, and the preset sliding window may include sliding windows of one or more specifications. The sliding window slides on the original image and a plurality of image areas may be obtained. The number of the obtained image areas on the original image is referred to as the first number in this text, which may be a predetermined number, and may also be determined according to actual acquisition conditions (for instance, the size of the original image, the specification of the sliding window, and the sliding step length of the sliding window) of the image areas.

In an example, the preset conditions may include: a qualified object is detected in the original image. Illustratively, the description that the qualified object is detected in the original image includes: one or more of the object size, the object definition, the object angle, the object's extent of eye closure, and the object's occlusion extent of the object detected in the original image satisfy corresponding requirements.

Illustratively, the method 200 may further comprise: performing an object detection on the original image, as for each of the at least one original image. Subsequently, whether a qualified object is detected may be determined according to the object detection result. Description is given below by taking that a face is the object as an example. For instance, each original image may be subjected to face detection, and if a face is not detected in the original image, it can be determined that the preset condition is not satisfied. If a face is detected in the original image, but the size of the face does not reach the preset size, it can be determined that the preset condition is not satisfied. As similar to the size of the face, other parameters of the face, such as the face definition, the face angle, the face's extent of eye closure, the face's occlusion extent and the like, may have respective corresponding requirements, e.g., the preset definition, the preset angle, the preset extent of eye closure, the preset occlusion extent and the like. Each parameter of the face may be compared with respective corresponding requirement, and whether the parameter satisfies the requirement is determined. No further description will be given in this text.

Several examples of the preset conditions are described above and not intended to limit the embodiment of the present disclosure. What conditions are used as the preset conditions may be set as needed. After filtering on the basis of the preset conditions, a plurality of original images satisfying the requirements may be obtained, and subsequently, images to be authenticated may be obtained on the basis of these original images and are subjected to subsequent object authentication.

In the embodiment of the present disclosure, after the step of determining whether the original image satisfies the preset conditions, as for each of the at least one original image, the method 200 may further comprise: outputting unlocking failure information in a case where the original image does not satisfy the preset conditions.

Figure 3:
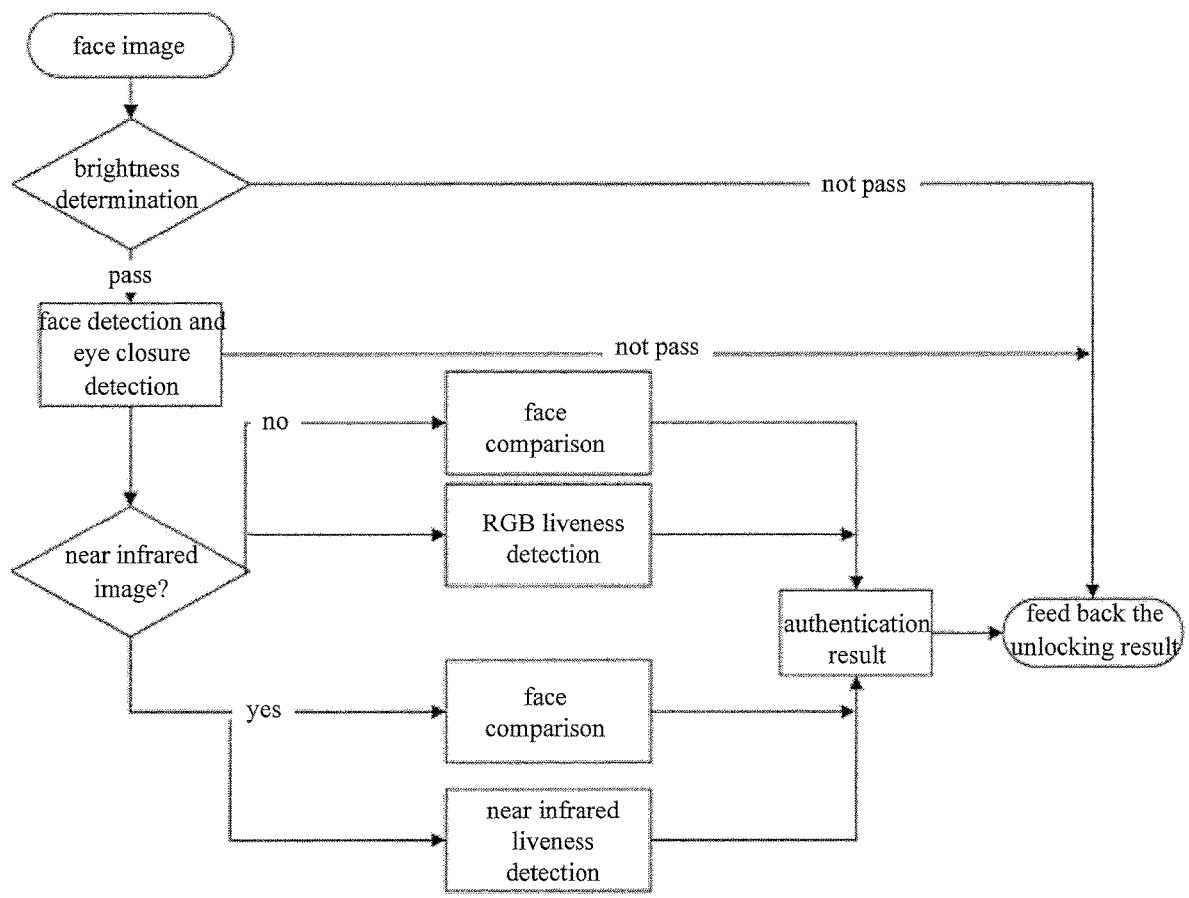
FIG. 3 is a schematic flowchart of a method of unlocking an electronic device provided by an embodiment of the present disclosure.

As for each of the at least one original image, the determination based on the preset conditions may be performed. In the case where the original image does not satisfy the preset conditions, the unlocking failure information is outputted. FIG. 3 is a schematic flowchart of a method of unlocking an electronic device provided by an embodiment of the present disclosure. As shown in FIG. 3, brightness determination is performed on the acquired face image at first; if the brightness determination passes, face detection and eye closure detection are performed; and if the face detection and the eye closure detection pass, the subsequent face authentication can be performed. Respective face authentication operations are executed for the RGB image and the infrared image respectively. During the brightness determination, the face detection, the eye closure detection and the face authentication, if one does not pass, a failed unlocking result can be get. In this case, unlocking failure information may be outputted. If all the above operations pass, a successful unlocking result can be get. In this case, the unlocking operation described above may be executed.

The unlocking failure information may include one or more of text, voice and image information, and can be outputted by an output device such as a display and/or a loudspeaker for the viewing of the user. Thus, it is convenient for the user to know the unlocking state in time, and can enhance the interactivity of the device and improve user experience.

In the embodiment of the present disclosure, after the step S210, the method 200 may further comprise: determining whether the image to be authenticated is the RGB image or the infrared image according to data source information of the image to be authenticated, as for each of the at least one image to be authenticated, wherein the data source information is used for indicating that corresponding image to be authenticated is from the RGB imaging mode or the infrared imaging mode.

The data source information can indicate that the image to be authenticated is from which imaging mode. For instance, when the image to be authenticated is from the infrared imaging mode, the data source information may be marked as true; and when the image to be authenticated is from the RGB imaging mode, the data source information may be marked as false. Illustratively, the data source information may be transmitted into the device (e.g., the unlocking system) for executing the method 200, together with corresponding image to be authenticated, and the unlocking system determines whether the currently received image to be authenticated is an RGB image or an infrared image according to the data source information.

In an example, the device such as a mobile terminal may include an illumination sensor which is configured to sense the illumination condition around the device. The illumination sensor may output the luminance value for representing the current illumination condition. The device may determine whether the current environment is normal light environment or dark environment according to the luminance value, and correspondingly, select suitable imaging mode. In an example, the data source information may include the luminance value outputted by the illumination sensor. Illustratively, in an example in which the image acquisition unit switches the imaging mode according to the luminance value, the unlocking system may determine whether the currently received image is an RGB image or an infrared image according to the luminance value. For instance, when the luminance value in the data source information indicates that the environment where the image to be authenticated is acquired is normal light environment, it can be considered that the image to be authenticated is an RGB image. Conversely, when the luminance value in the data source information indicates that the environment where the image to be authenticated is acquired is dark environment, it can be considered that the image to be authenticated is an infrared image.

For instance, the data source information of the image to be authenticated is consistent with the data source information of the original image corresponding to the image to be authenticated.

Figure 4:
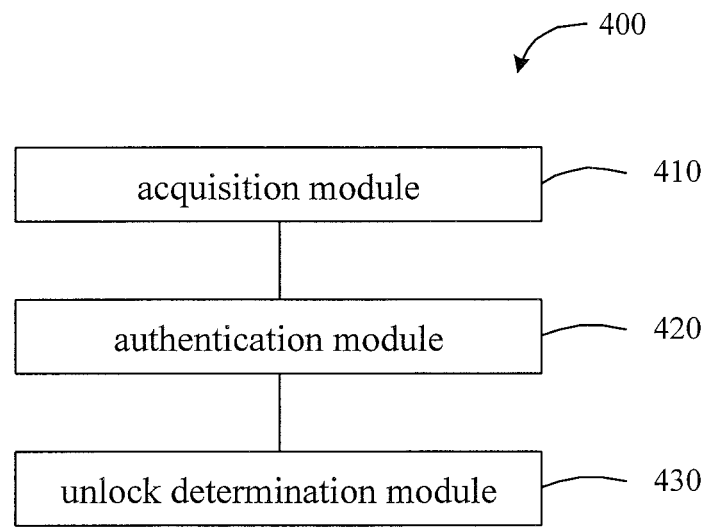
FIG. 4 is a schematic block diagram of an unlocking device provided by an embodiment of the present disclosure.

At least one embodiment of the present disclosure further provides an unlocking device. FIG. 4 is a schematic block diagram of an unlocking device 400 provided by an embodiment of the present disclosure.

As shown in FIG. 4, the unlocking device 400 provided by an embodiment of the present disclosure comprises an acquisition module 410, an authentication module 420 and an unlock determination module 430. The modules may respectively execute the steps/functions of the method described above with reference to FIGS. 2 and 3. The following describes only the main functions of the components of the unlocking device 400, and omits the details already described above.

The acquisition module 410 is configured to acquire at least one image to be authenticated. For instance, the image to be authenticated is an RGB image or an infrared image. The acquisition module 410 may be implemented by adoption of the processor 102 in the electronic device as shown in FIG. 1 to run the program instructions stored in the memory 104.

The authentication module 420 is configured to obtain an RGB image authentication result of the image to be authenticated by RGB object authentication of the image to be authenticated, in a case where the image to be authenticated is the RGB image; and obtain an infrared image authentication result of the image to be authenticated by infrared object authentication of the image to be authenticated, in a case where the image to be authenticated is the infrared image. The authentication module 420 may be implemented by adoption of the processor 102 in the electronic device as shown in FIG. 1 to run the program instructions stored in the memory 104.

The unlock determination module 430 is configured to determine whether to unlock an electronic device according to at least one of the RGB image authentication result and the infrared image authentication result. The unlock determination module 430 may be implemented by adoption of the processor 102 in the electronic device as shown in FIG. 1 to run the program instructions stored in the memory 104.

Illustratively, the authentication module 420 includes: a first comparison sub-module configured to obtain an object comparison result of the image to be authenticated by an object comparison of the image to be authenticated and a first background database image, in the case where the image to be authenticated is the RGB image; and a first determination sub-module configured to determine an RGB image authentication result of the image to be authenticated at least according to the object comparison result of the image to be authenticated; and/or the authentication module 420 includes: a second comparison sub-module configured to obtain an object comparison result of the image to be authenticated by an object comparison of the image to be authenticated and a second background database image, in the case where the image to be authenticated is the infrared image; and a second determination sub-module configured to determine an infrared image authentication result of the image to be authenticated at least according to the object comparison result of the image to be authenticated.

Illustratively, the authentication module 420 further includes: a first liveness detection sub-module configured to obtain an RGB liveness detection result of the image to be authenticated by an RGB liveness detection of the image to be authenticated, in the case where the image to be authenticated is the RGB image. The first determination sub-module is specifically configured to determine the RGB image authentication result of the image to be authenticated according to the object comparison result and the RGB liveness detection result of the image to be authenticated.

Illustratively, the authentication module 420 further includes: a second liveness detection sub-module configured to obtain an infrared liveness detection result of the image to be authenticated by an infrared liveness detection of the image to be authenticated, in the case where the image to be authenticated is the infrared image. The second determination sub-module is specifically configured to determine the infrared image authentication result of the image to be authenticated according to the object comparison result and the infrared liveness detection result of the image to be authenticated.

Illustratively, the first background database image includes an RGB image and/or an infrared image of a first known object, and the second background database image includes an RGB image and/or an infrared image of a second known object.

Illustratively, the at least one image to be authenticated includes two images to be authenticated which are respectively a first RGB image and a first infrared image (i.e., an RGB image and an infrared image); and the unlock determination module 430 is specifically configured to determine to unlock if both the RGB image authentication result and the infrared image authentication result of the two images to be authenticated indicate that the object authentication passes and objects in the two images to be authenticated match with a same known object, or else, determine not to unlock.

Illustratively, the acquisition module 410 includes: an acquisition sub-module configured to acquire at least one original image; and a determination sub-module configured to determine whether the original image satisfies preset conditions as for each of the at least one original image, and determine that the original image is one of the at least one image to be authenticated in case so, or obtain one of the at least one image to be authenticated by the transformation of the original image, wherein the preset conditions include one or more of the following items: the original image is an image of a preset type, in which the image of the preset type is the RGB image and/or the infrared image, and the preset type is default or determined by a user instruction; image brightness of the original image is within a first brightness range; area brightness of a predetermined number of image areas in a first number of image areas of the original image is within a second brightness range; and a qualified object is detected in the original image.

Illustratively, the description that the qualified object is detected in the original image includes: one or more of the object size, the object definition, the object angle, the object's extent of eye closure, and the object's occlusion extent of the object detected in the original image satisfy corresponding requirements.

Illustratively, the unlocking device 400 further comprises: an area acquisition module (not shown in the figure) configured to obtain the first number of image areas of the original image by adoption of a preset sliding window to slide on the original image, as for each of the at least one original image.

Illustratively, the unlocking device 400 further comprises: an output module (not shown in the figure) configured to output unlocking failure information if the original image does not satisfy the preset conditions, after the determination sub-module determines whether the original image satisfies the preset conditions as for each of the at least one original image.

Illustratively, the unlocking device 400 further comprises: a determination module (not shown in the figure) configured to determine whether the image to be authenticated is an RGB image or an infrared image according to data source information of the image to be authenticated, as for each of the at least one image to be authenticated, after the acquisition module 410 acquires the at least one image to be authenticated, wherein the data source information is used for indicating that corresponding image to be authenticated is from an RGB imaging mode or an infrared imaging mode.

The acquisition module 410, the authentication module 420, the unlock determination module 430, the area acquisition module, the output module, the determination module and the sub-modules in the modules may all be implemented by adoption of the processor to run the program instructions stored in the memory, and may also be implemented by special-purpose or general-purpose electronic hardware (or circuit), which is not limited in the embodiment of the present disclosure. The specific structure of the above electronic hardware is not limited and may include an analog device, a digital chip or other suitable device. The modules and the sub-module can be implemented in a same way or different ways.

It should be appreciated by those skilled in the art that the units and the algorithm steps of the examples described in connection with the embodiments disclosed herein can be implemented by electronic hardware or a combination of computer software and electronic hardware. Whether these functions are performed in hardware or software depends on the specific application and the design constraints of the technical proposals. Different methods may be used by those skilled in the art to implement the described functions in accordance with each particular application, but such implementation should not be considered to be beyond the scope of the present disclosure.

Figure 5:
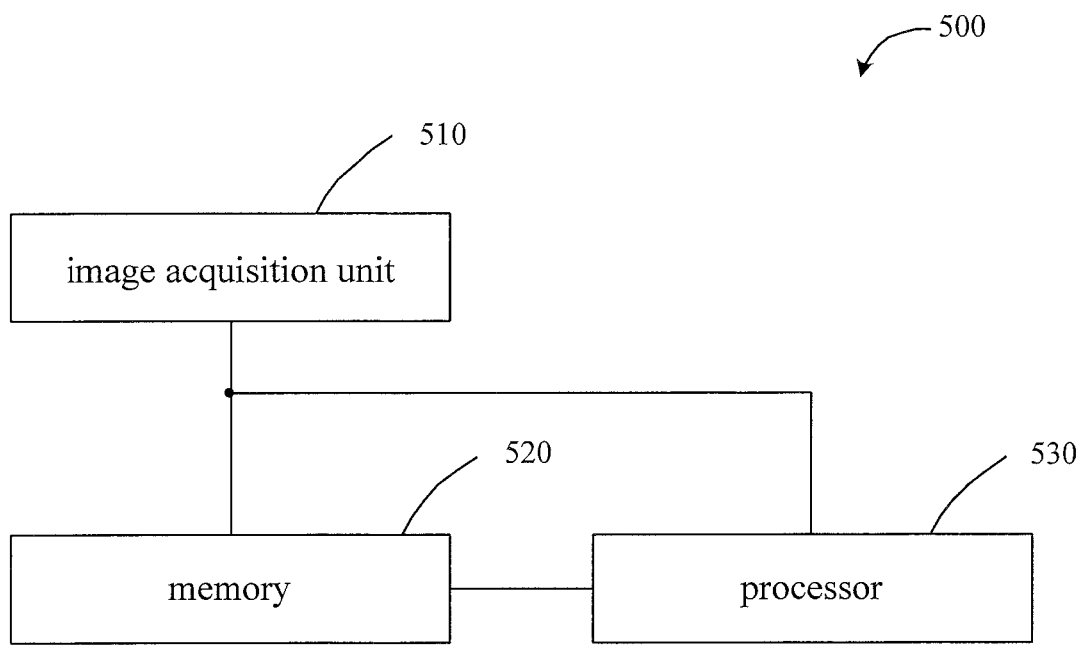
FIG. 5 is a schematic block diagram of an unlocking system provided by an embodiment of the present disclosure.

FIG. 5 is a schematic block diagram of au unlocking system 500 provided by an embodiment of the present disclosure. The unlocking system 500 comprises an image acquisition unit 510, a memory 520 and a processor 530.

The image acquisition unit 510 is configured to acquire images (the original images described above). The image acquisition unit 510 is optional, and the unlocking system 500 may not comprise the image acquisition unit 510. In this case, other image acquisition units may be utilized to acquire images and send the acquired images to the unlocking system 500.

The memory 520 stores computer program instructions used for implementing corresponding steps in the method provided by the embodiment of the present disclosure.

The processor 530 is configured to run the computer program instructions stored in the memory 520, so as to execute corresponding steps in the method provided by the embodiment of the present disclosure.

In an embodiment, the following steps are executed when the computer program instructions are run by the processor 530: acquiring at least one image to be authenticated is an RGB image or an infrared image; obtaining an RGB image authentication result of the image to be authenticated by RGB object authentication of the image to be authenticated, in a case where the image to be authenticated is the RGB image; obtaining an infrared image authentication result of the image to be authenticated by infrared object authentication of the image to be authenticated, in a case where the image to be authenticated is the infrared image; and determining whether to unlock the electronic device according to at least one of the RGB image authentication result and the infrared image authentication result.

Illustratively, the step of obtaining the RGB image authentication result of the image to be authenticated by the RGB object authentication of the image to be authenticated, in the case where the image to be authenticated is the RGB image, executed when the computer program instructions are run by the processor 530, includes: obtaining an object comparison result of the image to be authenticated by an object comparison of the image to be authenticated and a first background database image; and determining the RGB image authentication result of the image to be authenticated at least according to the object comparison result of the image to be authenticated; and/or the step of obtaining the infrared image authentication result of the image to be authenticated by the infrared object authentication of the image to be authenticated, in the case where the image to be authenticated is the infrared image, executed when the computer program instructions are run by the processor 530, includes: obtaining an object comparison result of the image to be authenticated by an object comparison of the image to be authenticated and a second background database image; and determining the infrared image authentication result of the image to be authenticated at least according to the object comparison result of the image to be authenticated.

Illustratively, the step of obtaining the RGB image authentication result of the image to be authenticated by the RGB object authentication of the image to be authenticated, in the case where the image to be authenticated is the RGB image, executed when the computer program instructions are run by the processor 530, further includes: obtaining an RGB liveness detection result of the image to be authenticated by an RGB liveness detection of the image to be authenticated; and the step of determining the RGB image authentication result of the image to be authenticated at least according to the object comparison result of the image to be authenticated, in the case where the image to be authenticated is the RGB image, executed when the computer program instructions are run by the processor 530, includes: determining the RGB image authentication result of the image to be authenticated according to the object comparison result and the RGB liveness detection result of the image to be authenticated.

Illustratively, the step of obtaining the infrared image authentication result of the image to be authenticated by the infrared object authentication of the image to be authenticated, in the case where the image to be authenticated is the infrared image, executed when the computer program instructions are run by the processor 530, further includes: obtaining an infrared liveness detection result of the image to be authenticated by an infrared liveness detection of the image to be authenticated; and the step of determining the infrared image authentication result of the image to be authenticated at least according to the object comparison result of the image to be authenticated, in the case where the image to be authenticated is the infrared image, executed when the computer program instructions are run by the processor 530, includes: determining the infrared image authentication result of the image to be authenticated according to the object comparison result and the infrared liveness detection result of the image to be authenticated.

Illustratively, the first background database image includes an RGB image and/or an infrared image of a first known object, and the second background database image includes an RGB image and/or an infrared image of a second known object.

Illustratively, the at least one image to be authenticated includes two images to be authenticated which are respectively a first RGB image and a first infrared image (i.e., an RGB image and an infrared image); and the step of determining whether to unlock the electronic device according to at least one of the RGB image authentication result and the infrared image authentication result, executed when the computer program instructions are run by the processor 530, includes: determining to unlock the electronic device if both the RGB image authentication result and the infrared image authentication result of the two images to be authenticated indicate that the object authentication passes, and objects in the two images to be authenticated match with a same known object, or else, determining not to unlock the electronic device.

Illustratively, the step of acquiring the at least one image to be authenticated, executed when the computer program instructions are run by the processor 530, includes: acquiring at least one original image; determining whether the original image satisfies preset conditions as for each of the at least one original image, determining that the original image is one of the at least one image to be authenticated if so, or obtaining one of the at least one image to be authenticated by the transformation of the original image, wherein the preset conditions include one or more of the following items: the original image is an image of a preset type, in which the image of the preset type is the RGB image and/or the infrared image, and the preset type is default or determined by a user instruction; image brightness of the original image is within a first brightness range; area brightness of a predetermined number of image areas in a first number of image areas of the original image is within a second brightness range; and a qualified object is detected in the original image.

Illustratively, the description that the qualified object is detected in the original image includes: one or more of the object size, the object definition, the object angle, the object's extent of eye closure, and the object's occlusion extent of the object detected in the original image satisfy corresponding requirements.

Illustratively, the following step is also executed when the computer program instructions are run by the processor 530: obtaining the first number of image areas of the original image by adoption of a preset sliding window to slide on the original image, as for each of the at least one original image.

Illustratively, after the step of determining whether the original image satisfies the preset conditions, as for each of the at least one original image, executed when the computer program instructions are run by the processor 530, the following step is also executed when the computer program instructions are run by the processor 530: outputting unlocking failure information if the original image does not satisfy the preset conditions.

Illustratively, after the step of acquiring the at least one image to be authenticated, executed when the computer program instructions are run by the processor 530, the following step is also executed when the computer program instructions are run by the processor 530: determining whether the image to be authenticated is the RGB image or the infrared image according to data source information of the image to be authenticated, as for each of the at least one image to be authenticated, wherein the data source information is used for indicating that corresponding image to be authenticated is from an RGB imaging mode or an infrared imaging mode.

For instance, the computer program instructions described above may be stored on a client (a personal terminal) and executed by a processor of the client, and may also be stored on a server side (cloud side) and executed by a processor of the server side. For instance, in an example, the image to be authenticated may be acquired by the client; the client transmits the acquired image to the server side; and the sever side determines whether to unlock and feeds back the result of whether to unlock to the client, so that the client can perform unlocking operation according to the above result.

In addition, at least one embodiment of the present disclosure further provides a storage medium. Program instructions are stored on the storage medium. When run by a computer or a processor, the program instructions are used for executing corresponding steps of the method provided by the embodiment of the present disclosure, and implementing corresponding modules in the unlocking device provided by the embodiment of the present disclosure. The storage medium, for instance, may include a memory card of a smart phone, a storage unit of a tablet computer, a hard disk of a personal computer, an read-only memory (ROM), an erasable programmable read only memory (EPROM), a portable compact disk read only memory (CD-ROM), a USB memory, or any combination of the above storage media. For instance, the storage medium may be the memory 104 as shown in FIG. 1. No further description will be given here.

In an embodiment, when the program instructions are run by the computer or the processor, the computer or the processor can implement the functional modules of the unlocking device provided by the embodiment of the present disclosure, and/or can execute the method provided by the embodiment of the present disclosure.

In an embodiment, the following steps are executed when the program instructions are run: acquiring at least one image to be authenticated, in which the image to be authenticated is an RGB image or an infrared image; obtaining an RGB image authentication result of the image to be authenticated by RGB object authentication of the image to be authenticated, in a case where the image to be authenticated is the RGB image; obtaining an infrared image authentication result of the image to be authenticated by infrared object authentication of the image to be authenticated, in a case where the image to be authenticated is the infrared image; and determining whether to unlock the electronic device according to at least one of the RGB image authentication result and the infrared image authentication result.

Illustratively, the step of obtaining the RGB image authentication result of the image to be authenticated by the RGB object authentication of the image to be authenticated, in the case where the image to be authenticated is the RGB image, executed when the program instructions are run, includes: obtaining an object comparison result of the image to be authenticated by an object comparison of the image to be authenticated and a first background database image; and determining the RGB image authentication result of the image to be authenticated at least according to the object comparison result of the image to be authenticated; and/or the step of obtaining the infrared image authentication result of the image to be authenticated by the infrared object authentication of the image to be authenticated, in the case where the image to be authenticated is the infrared image, executed when the program instructions are run, includes: obtaining an object comparison result of the image to be authenticated by an object comparison of the image to be authenticated and a second background database image; and determining the infrared image authentication result of the image to be authenticated at least according to the object comparison result of the image to be authenticated.

Illustratively, the step of obtaining the RGB image authentication result of the image to be authenticated by the RGB object authentication of the image to be authenticated, in the case where the image to be authenticated is the RGB image, executed when the program instructions are run, further includes: obtaining an RGB liveness detection result of the image to be authenticated by an RGB liveness detection of the image to be authenticated; and the step of determining the RGB image authentication result of the image to be authenticated at least according to the object comparison result of the image to be authenticated, in the case where the image to be authenticated is the RGB image, executed when the program instructions are run, includes: determining the RGB image authentication result of the image to be authenticated according to the object comparison result and the RGB liveness detection result of the image to be authenticated.

Illustratively, the step of obtaining the infrared image authentication result of the image to be authenticated by the infrared object authentication of the image to be authenticated, in the case where the image to be authenticated is the infrared image, executed when the program instructions are run, further includes: obtaining an infrared liveness detection result of the image to be authenticated by an infrared liveness detection of the image to be authenticated; and the step of determining the infrared image authentication result of the image to be authenticated at least according to the object comparison result of the image to be authenticated, in the case where the image to be authenticated is the infrared image, executed when the program instructions are run, includes: determining the infrared image authentication result of the image to be authenticated according to the object comparison result and the infrared liveness detection result of the image to be authenticated.

Illustratively, the first background database image includes an RGB image and/or an infrared image of a first known object, and the second background database image includes an RGB image and/or an infrared image of a second known object.

Illustratively, the at least one image to be authenticated includes two images to be authenticated which are respectively a first RGB image and a first infrared image (i.e., an RGB image and an infrared image); and the step of determining whether to unlock the electronic device according to at least one of the RGB image authentication result and the infrared image authentication result, executed when the program instructions are run, includes: determining to unlock the electronic device if both the RGB image authentication result and the infrared image authentication result of the two images to be authenticated indicate that the object authentication passes, and objects in the two images to be authenticated match with a same known object, or else, determining not to unlock the electronic device.

Illustratively, the step of acquiring the at least one image to be authenticated, executed when the program instructions are run, includes: acquiring at least one original image; determining whether the original image satisfies preset conditions as for each of the at least one original image, determining that the original image is one of the at least one image to be authenticated if so, or obtaining one of the at least one image to be authenticated by the transformation of the original image, wherein the preset conditions include one or more of the following items: the original image is an image of a preset type, in which the image of the preset type is the RGB image and/or the infrared image, and the preset type is default or determined by a user instruction; image brightness of the original image is within a first brightness range; area brightness of a predetermined number of image areas in a first number of image areas of the original image is within a second brightness range; and a qualified object is detected in the original image.

Illustratively, the description that the qualified object is detected in the original image includes: one or more of the object size, the object definition, the object angle, the object's extent of eye closure, and the object's occlusion extent of the object detected in the original image satisfy corresponding requirements.

Illustratively, the following step is also executed when the program instructions are run: obtaining the first number of image areas of the original image by adoption of a preset sliding window to slide on the original image, as for each of the at least one original image.

Illustratively, after the step of determining whether the original image satisfies the preset conditions, as for each of the at least one original image, executed when the program instructions are run, the following step is also executed when the program instructions are run: outputting unlocking failure information if the original image does not satisfy the preset conditions.

Illustratively, after the step of acquiring the at least one image to be authenticated, executed when the program instructions are run, the following step is also executed when the program instructions are run: determining whether the image to be authenticated is the RGB image or the infrared image according to data source information of the image to be authenticated, as for each of the at least one image to be authenticated, wherein the data source information is used for indicating that corresponding image to be authenticated is from an RGB imaging mode or an infrared imaging mode.

The modules in the unlocking system provided by the embodiment of the present disclosure may be implemented by adoption of the processor in the electronic device for unlocking provided by the embodiment of the present disclosure to run the computer program instructions in the memory, or may be implemented in the process of running the computer instructions stored on the computer readable storage medium of the computer program product provided by the embodiment of the present disclosure.

Although the embodiments of the present disclosure have been described herein with reference to the drawings, it is to be understood that the embodiments are only illustrative and not intended to limit the scope of the present disclosure. Various changes and modifications may be made therein by those skilled in the art without departing from the scope and spirit of the present disclosure. All such changes and modifications shall fall within the scope of the present disclosure defined by the appended claims.

It should be appreciated by those skilled in the art that the units and the algorithm steps of the examples described in connection with the embodiments disclosed herein can be implemented in electronic hardware or a combination of computer software and electronic hardware. Whether these functions are performed in hardware or software depends on the specific application and the design constraints of the technical proposals. The described functions may be implemented by those skilled in the art in accordance with each particular application, using different methods, but such implementation should not be considered to be beyond the scope of the present disclosure.

In the several embodiments provided by the present disclosure, it should be understood that the disclosed device and method may be implemented in other manners. For example, the device embodiments described above are merely illustrative. For example, the division of the unit is only a logical function division. In actual implementation, there may be other division manners. For example, multiple units or components may be combined or integrated into another device, or some characteristics can be ignored or not executed.

In the description provided herein, numerous specific details are set forth. However, it should be understood that the embodiments of the present disclosure may be practiced without these specific details. In some examples, well-known methods, structures and technologies are not illustrated in detail so as not to obscure the understanding of the description.

Similarly, in order to simplify the present disclosure and to facilitate the understanding of one or more of the embodiments, in the description of the exemplary embodiments of the present disclosure, the characteristics of the present disclosure are sometimes grouped together into a single embodiment, figure or description thereof. However, the method provided by the present disclosure should not be construed as reflecting the following intention: the claimed disclosure requires more characteristics than those explicitly recited in each claim. More precisely, as reflected by the appended claims, the disclosure lies in that the technical problems can be solved with fewer characteristics than all of the characteristics of a single disclosed embodiment. Thus, the claims following the detailed description are hereby explicitly incorporated into the detailed description, wherein each of the claims is a separate embodiment of the present disclosure.

It should be understood by those skilled in the art that all the characteristics disclosed in the description (including the accompanying claims, abstract and drawings) and all the processes or units of all the methods or devices disclosed may be employed in any combination, unless the characteristics are mutually exclusive. Unless stated otherwise, each characteristic disclosed in the description (including the accompanying claims, abstract and drawings) may be replaced by an alternative characteristic that provides the same, equivalent or similar purpose.

In addition, it shall be understood by those skilled in the art that although some embodiments described herein include certain characteristics that are included in other embodiments and are not other characteristics, combinations of the characteristics of different embodiments are intended to be within the scope of the present disclosure and form different embodiments. For example, in the claims, any one of the claimed embodiments can be used in any combination.

The component embodiments of the present disclosure may be implemented in hardware, or in a software module running on one or more processors, or in a combination thereof. It shall be understood by those skilled in the art that a microprocessor or a DSP may be used in practice to implement some or all of the functions of some modules in the unlocking device provided by the embodiment of the present disclosure. The present disclosure may also be implemented as a device program (e.g., a computer program and a computer program product) for executing some or all of the methods described herein. The programs of the present disclosure may be stored on a computer readable medium or may be in the form of one or more signals. Such signals can be downloaded from the Internet website, provided on carrier signals, or provided in any other form.

It should be noted that the above embodiments are illustrative of the present disclosure and are not intended to limit the present disclosure, and alternative embodiments can be designed by those skilled in the art without departing from the scope of the appended claims. In the claims, any reference mark placed between parentheses shall not be construed as a limitation of the claims The word "comprise" does not exclude the presence of elements or steps that are not recited in the claims. The word "a" or "an" disposed before the element does not exclude the existence of multiple such elements. The present disclosure can be implemented by hardware comprising several different elements, and by a suitably programmed computer. In the unit claims enumerating several units, some of these units can be embodied by the same hardware item. The use of the words first, second, third and the like does not indicate any order. These words can be interpreted as names.

What have been described above are only specific implementations of the present disclosure, the protection scope of the present disclosure is not limited thereto, and any changes or substitutions that are obvious to those skilled in the art within the scope of the present disclosure are intended to be included within the scope of the present disclosure. The protection scope of the present disclosure should be based on the protection scope of the claims.

What is claimed is:

1. A method of unlocking an electronic device, the method executed by an authenticator, the method comprising:
   acquiring, by an image acquisition module of the electronic device, at least one image to be authenticated, in which the image to be authenticated is an RGB image acquired in an RGB imaging mode or an infrared image acquired in an infrared imaging mode;
   determining whether each of the at least one image to be authenticated is an RGB image or an infrared image according to data source information of the at least one image to be authenticated, the data source information indicating that a respective one of the at least one image to be authenticated is from the RGB imaging mode or the infrared imaging mode;
   obtaining an RGB image authentication result of the image to be authenticated by RGB object authentication of the image to be authenticated when it is determined that a respective one of the image to be authenticated is an RGB image, and obtaining an infrared image authentication result of the image to be authenticated by infrared object authentication of the image to be authenticated when it is determined that a respective one of the image to be authenticated is an infrared image; and
   determining whether to unlock the electronic device according to at least one of the RGB image authentication result and the infrared image authentication result.

2. The method according to claim 1, wherein the infrared image comprises a near infrared image, and the infrared object authentication comprises near infrared object authentication.

3. The method according to claim 1, wherein obtaining the RGB image authentication result of the at least one image to be authenticated by the RGB object authentication of the image to be authenticated comprises:

obtaining an object comparison result of the at least one image to be authenticated by an object comparison of the image to be authenticated and a first background database image; and determining the RGB image authentication result of the image to be authenticated at least based on the object comparison result of the image to be authenticated; and obtaining the infrared image authentication result of the at least one image to be authenticated by the infrared object authentication of the image to be authenticated comprises:

obtaining an object comparison result of the at least one image to be authenticated by an object comparison of the at least one image to be authenticated and a second background database image; and determining the infrared image authentication result of the at least one image to be authenticated at least based on the object comparison result of the at least one image to be authenticated.

4. The method according to claim 3, wherein obtaining the RGB image authentication result of the at least one image to be authenticated by the RGB object authentication of the at least one image to be authenticated further comprises:

obtaining an RGB living body detection result of the at least one image to be authenticated by an RGB living body detection of the at least one image to be authenticated; and determining the RGB image authentication result of the at least one image to be authenticated at least based on the object comparison result of the at least one image to be authenticated, when it is determined that a respective one of the image to be authenticated is an RGB image comprises:

determining the RGB image authentication result of the at least one image to be authenticated according to the object comparison result and the RGB living body detection result of the at least one image to be authenticated.

5. The method according to claim 3, wherein obtaining the infrared image authentication result of the at least one image to be authenticated by the infrared object authentication of the at least one image to be authenticated further comprises:

obtaining an infrared living body detection result of the at least one image to be authenticated by an infrared living body detection of the at least one image to be authenticated; and determining the infrared image authentication result of the at least one image to be authenticated at least based on the object comparison result of the at least one image to be authenticated, when it is determined that a respective one of the image to be authenticated is an infrared image comprises:

determining the infrared image authentication result of the at least one image to be authenticated according to the object comparison result and the infrared living body detection result of the at least one image to be authenticated.

6. The method according to claim 3, wherein the first background database image comprises an RGB image and an infrared image of a first known object, and the second background database image comprises an RGB image and an infrared image of a second known object.

7. The method according to claim 1, wherein the at least one image to be authenticated comprises two images to be authenticated which are respectively a first RGB image and a first infrared image, and wherein the determining whether to unlock the electronic device according to the at least one of the RGB image authentication result and the infrared image authentication result comprises:

determining to unlock the electronic device when it is determined that both the RGB image authentication result and the infrared image authentication result of the two images to be authenticated indicate that the object authentication passes and objects in the two images to be authenticated match with a same known object, or determining not to unlock the electronic device.

8. The method according to claim 1, wherein the acquiring of the at least one image to be authenticated comprises:

acquiring at least one original image; and determining whether the at least one original image satisfies preset conditions for each of the at least one original image, determining that the at least one original image is one of the at least one image to be authenticated when it is determined that the at least one original image satisfies the preset conditions, or obtaining one of the at least one image to be authenticated by transformation of the original image, wherein the preset conditions comprise one or more of following items:

the original image is an image of a preset type, in which the image of the preset type is the RGB image and/or the infrared image, and the preset type is default or determined by a user instruction;

image brightness of the original image is within a first brightness range;

area brightness of a predetermined number of image areas in a first number of image areas of the original image is within a second brightness range; and a qualified object is detected in the original image.

9. The method according to claim 8, wherein the detected qualified object in the original image comprises:

one or more of object size, object definition, object angle, object's extent of eye closure, or the object's occlusion extent of the object detected in the original image satisfy corresponding requirements.

10. The method according to claim 8, further comprising:

obtaining the first number of image areas of the original image by adoption of a preset sliding window to slide on the original image, as for each of the at least one original image.

11. The method according to claim 8, wherein after determining whether the original image satisfies the preset conditions as for each of the at least one original image, the method further comprises:

outputting unlocking failure information when it is determined that the original image does not satisfy the preset conditions.

12. An unlocking device for an electronic device, comprising:

an acquisition module configured to acquire at least one image to be authenticated, in which the at least one image to be authenticated is an RGB image, acquired in an RGB imaging mode, or an infrared image, acquired in an infrared imaging mode;

an authentication module configured to:

determine whether the acquired at least one image to be authenticated is an RGB image or an infrared image according to data source information of the acquired at least one image to be authenticated, the data source information indicating that a respective one of the acquired at least image to be authenticated is from the RGB imaging mode or the infrared imaging mode;

obtain an RGB image authentication result of the acquired at least one image to be authenticated by RGB object authentication of the acquired at least one image to be authenticated when it is determined that the acquired at least one image to be authenticated is an RGB image, and obtain an infrared image authentication result of the acquired at least one image to be authenticated by infrared object authentication of the acquired at least one image to be authenticated when it is determined that the image to be authenticated is an infrared image; and an unlock determination module configured to determine whether to unlock the electronic device according to at least one of the RGB image authentication result and the infrared image authentication result.

13. A method of unlocking an electronic device utilizing an unlocking system that comprises a processor and a memory, wherein computer program instructions are stored in the memory, and the method is executed when the computer program instructions are run by the processor, the method comprising:

acquiring at least one image to be authenticated, in which the at least one image to be authenticated is an RGB image, acquired in an RGB imaging mode, or an infrared image, acquired in an infrared imaging mode;

determining whether each of the at least one image to be authenticated is an RGB image or an infrared image according to data source information of the at least one image to be authenticated, the data source information indicating that a respective one of the at least one image to be authenticated is from the RGB imaging mode or the infrared imaging mode;

obtaining an RGB image authentication result of the image to be authenticated by RGB object authentication of the image to be authenticated when it is determined that a respective one of the image to be authenticated is an RGB image, and obtaining an infrared image authentication result of the image to be authenticated by infrared object authentication of the image to be authenticated when it is determined that a respective one of the image to be authenticated is an infrared image; and determining whether to unlock the electronic device according to at least one of the RGB image authentication result and the infrared image authentication result.

14. A non-transitory storage medium, wherein program instructions are stored on the storage medium, and a method of unlocking an electronic device is executed when the program instructions are run, the method comprising:

acquiring at least one image to be authenticated, in which the at least one image to be authenticated is an RGB image, acquired in RGB imaging mode, or an infrared image, acquired in infrared imaging mode;

determining whether each of the at least one image to be authenticated is an RGB image or an infrared image according to data source information of the at least one image to be authenticated, the data source information indicating that a respective one of the at least one image to be authenticated is from the RGB imaging mode or the infrared imaging mode;

obtaining an RGB image authentication result of the image to be authenticated by RGB object authentication of the image to be authenticated when it is determined that a respective one of the image to be authenticated is an RGB image, and obtaining an infrared image authentication result of the image to be authenticated by infrared object authentication of the image to be authenticated when it is determined that a respective one of the image to be authenticated is an infrared image; and determining whether to unlock the electronic device according to at least one of the RGB image authentication result and the infrared image authentication result.

* * * * *